UNITED STATES PATENT OFFICE.

CHESTER U. CHAMBERLIN, OF HARTFORD, NEW YORK.

COMPOSITION FOR PRESERVING EGGS.

SPECIFICATION forming part of Letters Patent No. 311,470, dated February 3, 1885.

Application filed May 21, 1884. (No specimens.)

*To all whom it may concern:*

Be it known that I, C. U. CHAMBERLIN, of Hartford, in the county of Washington and State of New York, have invented certain new and useful Improvements in Composition for Preserving Eggs; and I do hereby declare the following to be a full, clear, and exact description of the invention, such as will enable others skilled in the art to which it appertains to make and use the same.

My invention relates to an improvement in the composition for preserving eggs, the object being to preserve eggs without heating or otherwise subjecting them to processes that would decompose or tend to decompose the organic constituent thereof; and it consists in submerging eggs in a solution of alcohol, crystals salicylic acid, deodorized wood-naphtha, bleached resin-lac, and powdered chalk, the above ingredients being combined in the manner and in substantially the proportions hereinafter stated. In four gallons of alcohol dissolve one ounce of crystals salicylic acid. To this solution add one gallon deodorized wood-naphtha. After stirring the above well, add five pounds bleached resin-lac. Stir till dissolved, and then add one pound powdered English chalk. The eggs are submerged in this solution and then lifted out by any suitable means, and laid on a net, frame, or other receptacle to allow them to drain. The alcohol penetrates every pore of the eggs, and from its powerful affinity for water absorbs any moisture the air within the shell may hold, rendering the air therein dry and harmless. After the eggs are removed from the solution, the alcohol evaporates, carrying with it the moisture extracted from the egg, while the resin and naphtha deposited on the shell form a coating therefor, rendering the shell impervious to air and moisture, and thus preserving the egg for an indefinite period.

Having fully described my invention, what I claim as new, and desire to secure by Letters Patent, is—

The herein-described composition of matter for preserving eggs, consisting of alcohol, crystals salicylic acid, deodorized wood-naphtha, bleached resin-lac, and powdered chalk, in substantially the proportions named.

In testimony whereof I have signed this specification in presence of two subscribing witnesses.

CHESTER U. CHAMBERLIN.

Witnesses:
C. C. ATWOOD,
M. W. NORTHUP.